May 18, 1937.    E. A. NELSON    2,080,895
METHOD OF MAKING BRAKE DRUM AND DRUM SEAL
Filed Aug. 20, 1934
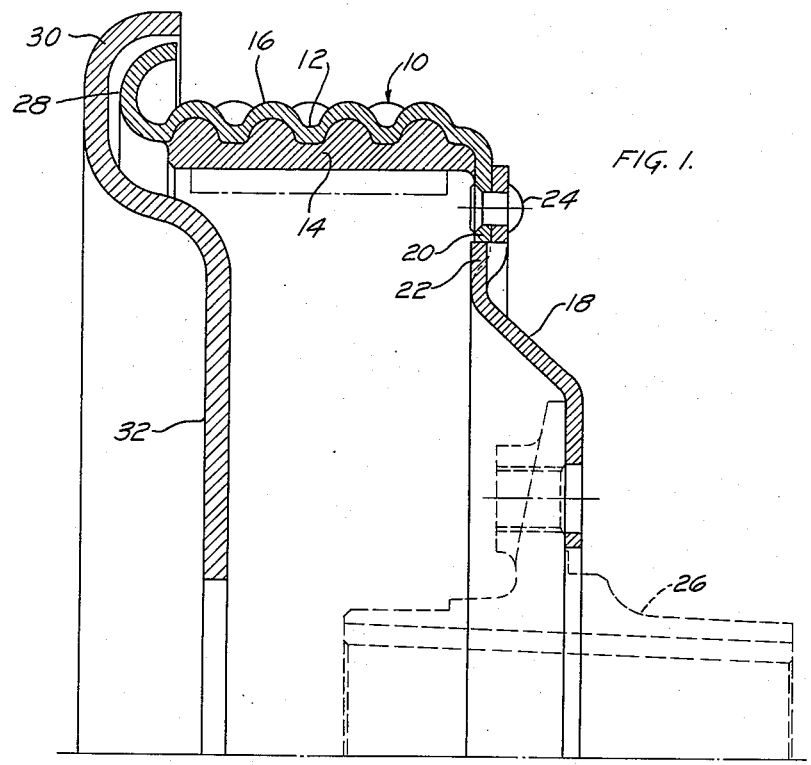
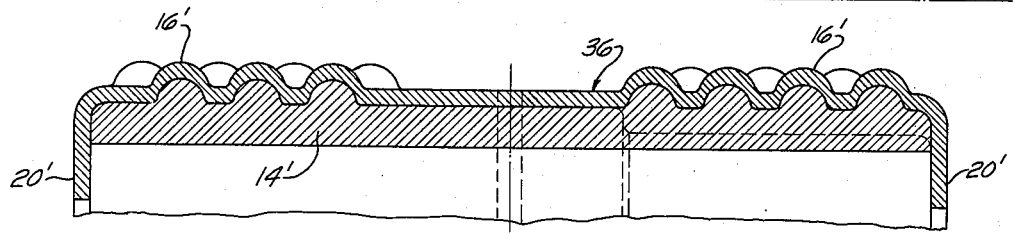
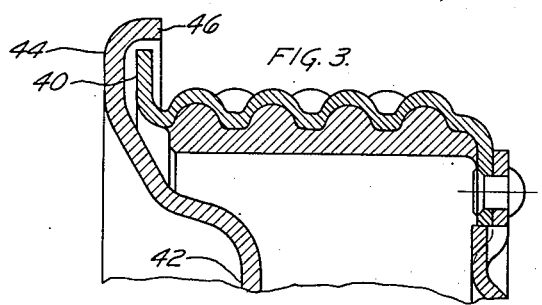
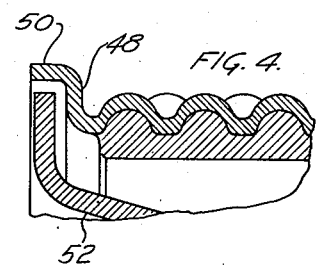
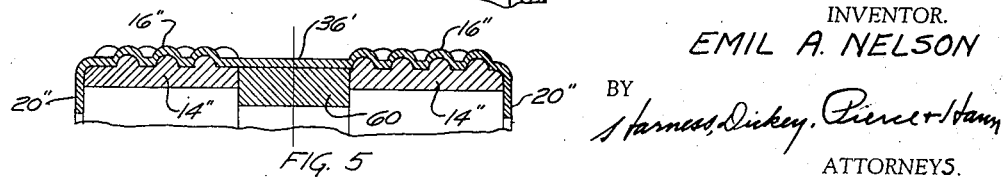
INVENTOR.
EMIL A. NELSON
BY
ATTORNEYS.

Patented May 18, 1937

2,080,895

UNITED STATES PATENT OFFICE 2,080,895

METHOD OF MAKING BRAKE DRUM AND DRUM SEAL

Emil A. Nelson, Lansing, Mich., assignor to Motor Wheel Corporation, a corporation of Michigan Application August 20, 1934, Serial No. 740,597

3 Claims. (Cl. 29—152.2)

This invention relates to brake drums and particularly to a method of making the same, the principal object being the provision of a method of making brake drums whereby brake drum structures identical in an advanced stage of operation may be acted upon to provide them with sealing elements of various shapes or types in the final product.

Objects of the invention are to provide a method of making a brake drum by casting metal onto the interior face of a sheet metal band, and so controlling and/or operating upon the assembly as to provide an end portion of the band projecting axially beyond the corresponding end face of the cast lining whereby to thereafter permit the projecting end of the band to be formed to any desired shape; to provide a method of making brake drum rings comprising forming a sheet metal band, casting metal on the interior face of said band to form a lining providing a braking surface, severing the band midway its length to form a pair of rings, and bending the sheet metal at the severed edge of each ring to form a sealing element; and the provision of a method of making a brake drum ring comprising forming a cylindrical sheet metal band having inwardly directed end flanges, casting metal onto the interior face of said ring to provide for a braking surface, severing the band midway its length to form two ring portions, removing the cast metal from the severed end of each of said portions, and then displacing the sheet metal margin at the severed end of each of said portions into a shape suitable for cooperation with a backing plate to provide a seal to prevent the entrance of foreign material to the interior of the brake drum.

The above being among the objects of the present invention, the same consists in certain novel steps of operation and combinations of steps of operations to be hereinafter described with reference to the accompanying drawing, and then claimed, having the above and other objects in view.

In the accompanying drawing which illustrates suitable embodiments of the present invention and in which like numerals refer to like parts throughout the several different views.

Figure 1 is a fragmentary sectional view taken axially through a brake drum and its cooperating backing plate.

Fig. 2 is a fragmentary sectional view taken axially through a pair of brake drum structures that have been simultaneously formed and before they have been severed into two separate brake drum rings.

Figs. 3 and 4 are fragmentary views similar to Fig. 1 showing modified forms of sealing element structures between the brake ring and the backing plate.

Fig. 5 is a view similar to Fig. 2, on reduced scale, to illustrate a slightly modified method of forming the brake rings.

A conventional form of brake drum ring widely employed at the present time is of a composite construction and includes a sheet metal outer ring portion having a cast iron or other cast metal liner intimately associated therewith and providing a braking surface. The sheet metal at the open end of the brake drum ring is commonly flanged outwardly to cooperate with the peripheral marginal portion of a cooperating backing plate so as to provide a seal to prevent the entrance of dust, dirt or other foreign material to the interior of the brake drum. The shapes of such flanges vary widely according to the desires of the particular user to which such brake drums are to be supplied. In the manufacture of such brake drums according to the method hereinbefore employed, the outer sheet metal ring portion is first formed to substantially its completed shape, the cast metal liner is then cast into place, preferably in a well known manner so as to effect a fusing of the cast metal liner to the sheet metal outer member, and then the braking surface of the composite ring is machined to bring it to its completed form. Accordingly, it will be understood that in accordance with conventional practice it is necessary for a manufacturer to carry a supply of sheet metal ring parts, some of which are formed to provide one shape or type of sealing element at its open end and others of which are shaped to provide a different shape or type of sealing element at its open end, thus rendering it necessary for the manufacturer to carry a supply of different groups of brake rings, the brake rings of all groups being identical with each other except that the rings of one group have a different form of sealing element from the rings of another group, and this requires the manufacture of such brake drums to keep a relatively large supply of such sheet metal elements on hand and thus tie up a relatively large investment in such supplies.

Instead of forming the brake rings singly as has heretofore been the practice, the brake rings are formed in pairs and severed thus effecting a considerable economy in the manufacture of such brake drums. Advantage is taken of this method of manufacture, in accordance with the present invention, so that all brake drum rings of a predetermined size, regardless of the form of sealing element to be employed in connection therewith, may be produced in an identical shape and manner up to substantially the last step of operation in the manufacture thereof and which last step comprises forming the open edge of the sheet metal portion of the brake drum ring to provide a sealing element of the desired shape and configuration. This permits all drums to be manufactured in an identical manner and permits the use of one type only of sheet metal bands or rings for each size of brake drum, not only providing important economies in manufacture but permitting the manufacturer to carry a relatively smaller amount of stock on hand to meet all possible requirements.

Referring now to the accompanying drawing, in Fig. 1 is illustrated a brake drum having a brake ring portion of composite construction. This brake ring which is illustrated generally at 10 in the present case comprises an outer band portion 12, preferably formed from sheet metal, provided with a cast metal liner 14 therein. Although in accordance with the present invention the particular configuration of the sheet metal band 12 is immaterial, in the present case it is shown as being formed to provide on its outer surface a plurality of closely associated circumferentially staggered outwardly projecting knobs or protuberances 16 for the purpose of enhancing the rigidity of the structure, increasing the heat transfer area thereof and to provide a more perfect interlocking and bond between the band 12 and liner 14.

In order to provide a means for securing the brake drum ring 10 to a suitable disc or web portion 18, what is commonly referred to as the closed end of the brake ring 10 is provided with a radially inwardly directed annular flange portion 20 formed by bending the corresponding marginal edge of the sheet metal brake portion 12 inwardly as indicated. The disc or web 18 is preferably formed from sheet metal and adjacent its radially outer margin is provided with a plurality of inwardly struck lugs 22 circumferentially spaced from each other and so disposed that their radially outward end surfaces are received within and abut against the inner edge surface of the flange 20 so as to pilot the ring 10 upon the web or disc 18. The radially outer edge of the web or disc 18 contacts against the axially outer face of the flange 20 and rivets 24 or other suitable means are employed for securing the two together. The inner edge of the disc 18 is formed for cooperation and securement to a suitable type of hub member indicated at 26 by dotted lines.

The marginal edge portion of the sheet metal band 12 at the open end of the drum is, in the particular case shown, bent outwardly and upwardly as at 28 into an approximately semi-circular sectional conformation. This portion 28 is housed within the curved outer marginal edge portion 30 of a conventional backing plate 32 and the portions 28 and 30 are so formed and arranged as to cooperate with one another to form a seal between the open end of the brake drum and the outer edge of the backing plate so as to prevent the entrance of dirt, dust, or other foreign material between them to the interior of the brake drum. The portion 28 thus forms one of the elements of such seal.

In constructing a brake ring such as 10 in accordance with the present invention, a strip of sheet metal having a width twice as great as the developed width of the sheet metal portion 12 is rolled up into a band or ring indicated generally at 36 in Fig. 2, the opposite marginal end edges of the band being flanged inwardly as at 20', the band 36 inwardly of each flange 20' and for a distance such as is required in the finished brake ring 10 is formed to provide the knobs or protuberances 16', and the mid-portion of the band 36 between the two axially spaced series of knobs 16 is preferably allowed to remain in true cylindrical formation. The band 36 thus formed is preferably placed in a suitable apparatus and rotated and molten cast metal is poured into it so as to provide the interior liner 14'. Preferably, the band 36 is heated prior to the introduction of the cast metal thereinto and the cast metal is brought to such a temperature that upon being poured into the band 36 during rotation thereof it will be caused to fuse to the ring 36 and thus effect an intimate bond therebetween permitting a maximum rate of heat transfer between the liner and the ring. It will be understood that because of the rotation of the band 36 when the liner 14 is cast therein, the molten metal forming the liner 14' will, because of the centrifugal force to which it is subjected, be deposited evenly over the inner face of the band 36.

Upon completion of this assembly it is severed midway between its ends into two separate ring portions or halves. The liner 14' is then cut away from the severed edge of each ring portion up to the first row of protuberances 16' thereon. This leaves the sheet metal of the ring 36 between the severed edge and the next adjacent row of protuberances 16 free of cast metal internally thereof, and each half or ring may then be rough machined. Each brake ring is thus completely finished except that the axially projecting sheet metal edge portion has not yet been formed to provide a sealing element and the inner face of the liner 14' has not yet been machined to finished size and condition.

Obviously, the axially projecting sheet metal portion may then be bent to any shape desired to effect a sealing element. For instance, it may be formed to the shape indicated by the element 28 in Fig. 1. On the other hand it may be bent radially outwardly as at 40 in Fig. 3 for cooperation with a backing plate 42 having a radially directed portion 44 relatively closely spaced with respect to the outer side face of the element 40 and an inturned marginal edge portion 46 adapted to overlie the radially outer edge of the element 40. This is one conventional form of seal for the open edge of a brake drum. Or that portion of the sheet metal band projecting axially beyond the liner 14 may, as illustrated in Fig. 4, be bent first radially outwardly as at 48 and then axially outwardly as at 50 so as to provide a sealing element arranged in closely spaced relation with respect to the inner side face of the marginally outer edge and radially outer edge, respectively, of a backing plate 52 bent into the formation indicated in Fig. 1. Obviously, the axially projecting sheet metal portion of the ring may be bent into any other suitable shape that may be necessary or desirable in a particular brake drum structure.

It will be understood, of course, that in the manufacture of such drums they will be formed up to the point of bending the axially projecting sheet metal portion along the severed edge described to the shape of the sealing element required in any particular case, and a number of such drums may be kept in stock so that when an order for a drum having a particular shape of sealing element thereon is received, such drums will require only that the axially projecting sheet metal portion be formed to the desired shape, after which the drum may be secured to the web or disc 18 and then machined to bring the braking surface thereof to final size and concentric relation and condition of finish.

It will be understood that in the manufacture of brake drums in accordance with the disclosure illustrated in Fig. 2, that it will not be necessary in all cases to completely fill the interior of the ring 36 with cast metal and then cut away that portion of the cast metal underlying what eventually will serve to form the sealing element of the brake drum ring. If desired, a removable filler block such as is illustrated at 60 in Fig. 5, of ring-like formation and disposed centrally of the ring 36' may be employed so that the liner portions 14' will be of substantially the desired width of the final product, and after the liner portions 14' are cast the filler element 60 may be removed, the ring 36' severed midway between its ends, and a brake drum of semi-finished condition be provided in a manner similar to that described above.

Formal changes may be made in the specific embodiment of the invention described without departing from the spirit or substance of the broad invention, the scope of which is commensurate with the appended claims.

What I claim is:

1. The method of forming brake drum rings including the steps of forming a strip of sheet metal into a cylindrical band having radially directed annular flanges at opposite ends thereof, inserting a removable filler element into said band midway between the ends thereof, casting a metal liner into said band, removing said filler element, then severing said band midway between its ends to form a pair of brake drum ring members, each having a sheet metal portion projecting axially beyond the corresponding end of said liner, and then forming said projecting portion to provide a sealing element.

2. The method of forming brake drum rings including the steps of forming a strip of sheet metal into a cylindrical band having radially inwardly directed annular flanges at opposite ends thereof, inserting a removable filler element midway between the ends thereof, casting a metal liner into said band, and removing said filler element and severing said band midway between its ends to form a pair of brake drum ring members, each having a sheet metal portion projecting axially beyond the corresponding end of said liner, which projecting portion is to be a shielding element for the ring member.

3. The method of forming brake drum rings including the steps of forming a cylindrical sheet metal member, inserting a removable filler element within the cylindrical member intermediate its ends, casting a metal liner into said member, removing said filler element, severing said member at the point at which the filler element was located to form a plurality of cylindrical members adapted to form brake bands, each having a sheet metal portion projecting axially beyond the corresponding end of said liner.

EMIL A. NELSON.